Figure 7:
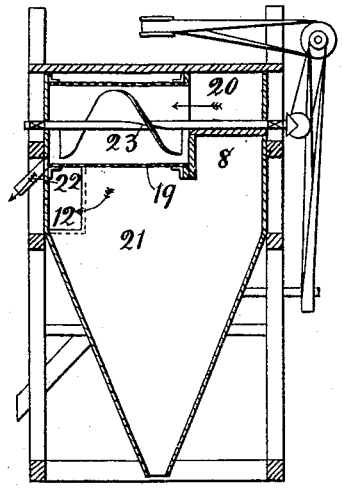

No. 880,242. PATENTED FEB. 25, 1908.
C. J. ROBINSON & J. BACKHOUSE.
MACHINE FOR SEPARATING DUST OR OTHER PARTICLES FROM GRANULAR SUBSTANCES.
APPLICATION FILED MAR. 27, 1907.
3 SHEETS—SHEET 1.
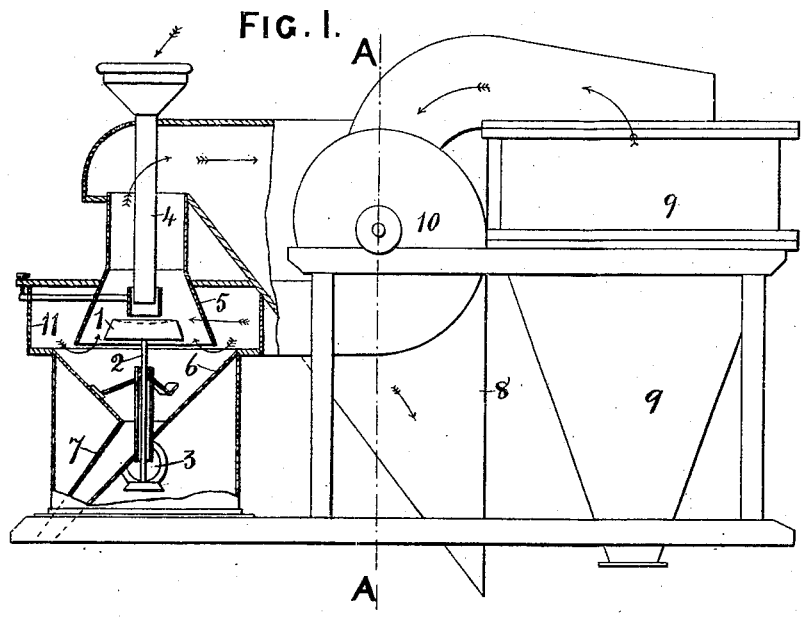
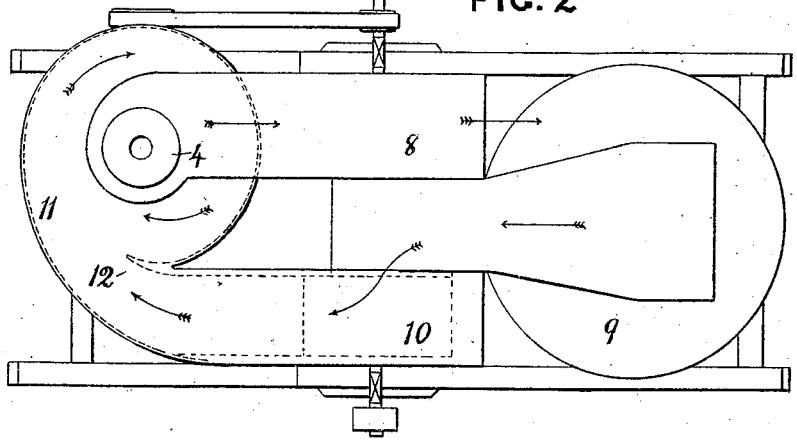

No. 880,242. PATENTED FEB. 25, 1908.
C. J. ROBINSON & J. BACKHOUSE.
MACHINE FOR SEPARATING DUST OR OTHER PARTICLES FROM GRANULAR SUBSTANCES.
APPLICATION FILED MAR. 27, 1907.
3 SHEETS—SHEET 2.
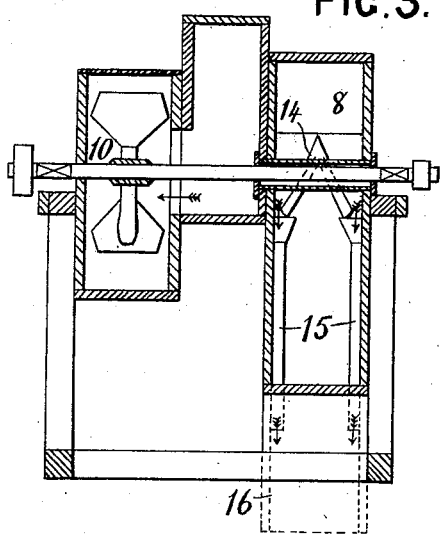
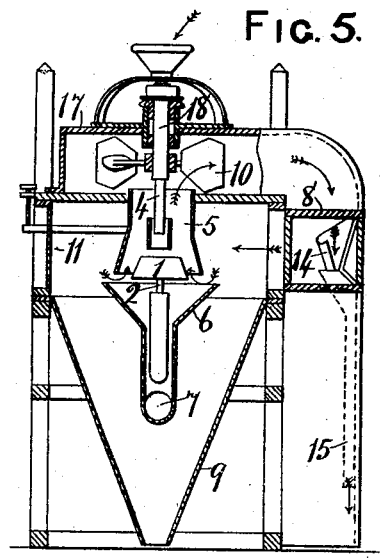
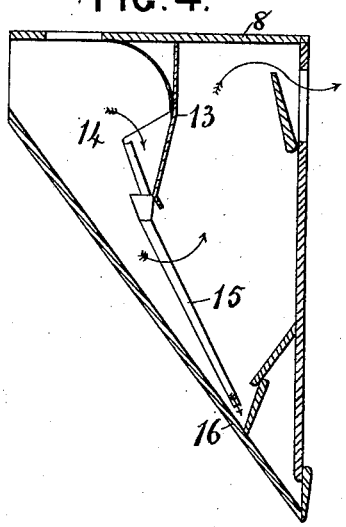
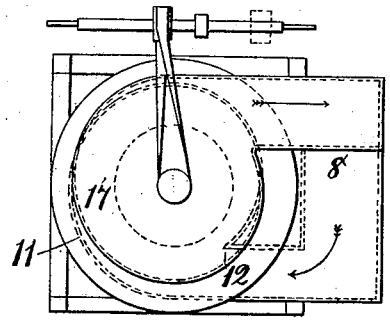
WITNESSES
INVENTORS
Charles John Robinson
John Backhouse No. 880,242. PATENTED FEB. 25, 1908.
C. J. ROBINSON & J. BACKHOUSE.
MACHINE FOR SEPARATING DUST OR OTHER PARTICLES FROM GRANULAR SUBSTANCES.
APPLICATION FILED MAR. 27, 1907.

3 SHEETS—SHEET 3.

WITNESSES
W. P. Burke
M. Petit

INVENTORS
Charles John Robinson
John Backhouse

THE NORRIS PETERS CO., WASHINGTON, D. C.

UNITED STATES PATENT OFFICE.

CHARLES JOHN ROBINSON AND JOHN BACKHOUSE, OF ROCHDALE, ENGLAND, ASSIGNORS TO THOMAS ROBINSON & SON LIMITED, A JOINT STOCK COMPANY OF GREAT BRITAIN.

MACHINE FOR SEPARATING DUST OR OTHER PARTICLES FROM GRANULAR SUBSTANCES.

No. 880,242.  Specification of Letters Patent.  Patented Feb. 25, 1908.

Application filed March 27, 1907. Serial No. 364,847.

*To all whom it may concern:*

Be it known that we, CHARLES JOHN ROBINSON and JOHN BACKHOUSE, subjects of the King of Great Britain, residing at Rochdale, in the county of Lancaster, England, have invented new and useful Improvements in Machines for Separating Dust or other Particles from Granular Substances, of which the following is a specification.
The invention relates to machines of the kind in which a current of air is drawn up through a stream of grain, either whole or broken thrown out laterally by a revolving horizontal plate or cup arranged within a surrounding hood: and the object is to provide means whereby the air may be returned continuously in a closed circuit through the stream of grain more uniformly and effectively, some of the dust or other particles separated from the grain being deposited from the air current at one or more points in the circuit.

The invention is hereafter described with reference to the accompanying drawings which show several arrangements under our invention.

In carrying out the invention in reference to Figures 1, 2, and 3 which are respectively a side elevation partly in section; a plan, and a transverse section at A A on Fig. 1, of a separating machine, we arrange the parts as shown and hereafter described.

1 is a revolving cup or disk supported on a shaft 2 and caused to rotate by gearing 3 in any convenient way. 4 is a spout through which granular substance is fed to the cup 1 which throws such substance off against a surrounding hood 5 from which it falls into the hopper 6 and is conducted out of the machine by the spout 7. The top of the hood 5 is connected through depositing chambers or dust collectors 8, 9, to the eye of a fan 10 or other air moving appliance which draws air up the hood 5 through the stream of falling grain thereby removing dust or light particles from the grain. The dust collector 9 may be, as shown, of the cyclone type. Similar arrangements to above are well known and no claim is made to them.
The fan 10 then delivers the air back to a chamber 11 preferably circular in plan and surrounding, at least, the lower part of the hood 5. The air enters the chamber 11 at 12 at a tangent so that such air takes a circular course round the chamber 11 which course is maintained as the air again passes up inside the hood 5, thereby more uniformly delivering the air to the grain falling from the cup 1 than has hitherto been done, the circular direction also giving a longer contact of the air with the grain thus rendering the separation of dust &c. more complete. It is essential that the air shall enter the chamber 11 at an approximately true tangent, otherwise the separation is not so efficient. If any dust should be deposited in the chamber 11 it may be removed from time to time by any convenient means but in practice it is found that none is deposited.

Instead of the depositing chambers or dust collectors 8, 9, being on the inlet side of the fan, they, or one of them may be on the outlet side. The depositing chamber 8, shown more clearly in Fig. 4 which is a vertical sectional view, is preferably provided with a division piece 13 which has on the entering side V shaped plates 14 with recurved edges leading into funnels 15. The plates 14 intercept a large proportion of the dust in the air and deliver it by means of the funnels to the bottom part 16 of the chamber 8.

Figure 8:
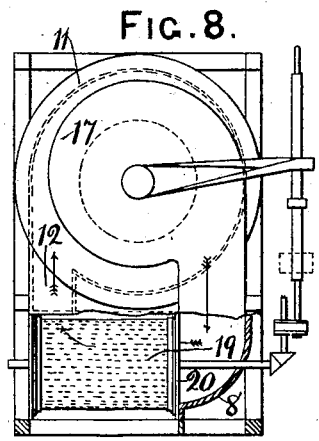

Fig. 5 is a vertical section, and Fig. 6 a plan of a modified arrangement under our invention. In this case the fan 10 is arranged in a case 17 above the chamber 11. The fan is carried on a rotatable sleeve 18, surrounding the feed spout 4, the hood 5 serving as the eye of the fan, while the air current is delivered out of the fan to a depositing chamber 8, whence it flows back into the chamber 11 at 12 at a tangent the chamber 11 having a conical bottom which acts as a dust collector similar to 9 in Fig. 1, to receive any remaining dust which may be deposited. Fig. 7 is a vertical section and Fig. 8 a plan of another arrangement of parts under our invention. This arrangement is similar to Figs. 5 and 6 except that the depositing chamber 8 is provided with a perforated cylinder 19 into which the air from the fan enters at 20 and escapes through the perforations into the expansion chamber 21 whence it flows through a passage 12 at a tangent into the chamber 11. The dust separated in the cylinder is moved to the outlet 22 by a rotating helical cleaning brush 23. Instead of the dust laden air passing outwardly from the interior of the cylinder 19 it may be arranged to pass inwardly in which case a cleaning brush would be arranged on the outside of the cylinder; and the cylinder might be arranged to rotate while the brush was stationary.

Figure 9:
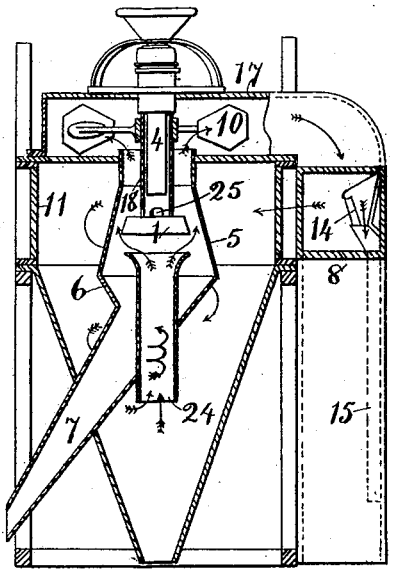

Fig. 9 is a vertical section of another modification under our invention. This is also similar to Figs. 5 and 6, excepting that the lower edge of the hood 5 is brought down to the upper edge of the hopper 6 and a central air tube 21, annular or otherwise, passes through the bottom of the hopper up to near the revolving cup 1. By this means instead of the air passing direct under the lower edge of the hood 5 it is, as it enters the chamber 11 at a tangent, caused to circulate round and round and pass up the central tube 24, from which it is delivered at the top as an annular stream round the cup 1 and up through the falling grain. In this figure the cup 1 instead of being rotated by a shaft below is attached to the rotating sleeve 18 which carries the fan 10, there being openings 25 in the sleeve to allow of grain passing out on to the cup. The cup however may be driven from below if desired.

We do not claim broadly an air chamber round the hood 5 nor a concentric fan but What we claim is 1. A separator comprising a hood, a rotary disk therein, means for feeding the material to said disk, an air tight chamber surrounding the lower part of the hood, a depositing chamber, a connection from the hood to the depositing chamber, a fan in said connection and a passage leading from the depositing chamber and entering the chamber surrounding the hood at a tangent for carrying the current of air from the fan to said chamber.

2. A separator comprising a hood, a rotary disk therein, means for feeding the material to said disk, an air tight chamber surrounding the lower part of the hood, a dust collector formed by the lower part of said chamber, a depositing chamber, a connection from the hood to the depositing chamber, a fan in said connection and a passage leading from the depositing chamber and entering the chamber surrounding the hood at a tangent for carrying the current of air from the fan to said chamber.

3. A separator comprising a hood, a rotating disk therein, means for feeding grain to said disk, an air tight chamber surrounding the lower part of said hood, a receiving hopper for the grain forming a downward continuation of the hood, a fan connected with the hood, a depositing chamber connected with the fan, a passage leading from the depositing chamber to the chamber surrounding the hood and entering the said chamber at a tangent and a tube having one end in communication with the latter chamber and its other end located under the disk.

In testimony whereof we have signed our names to this specification in the presence of two subscribing witnesses.

CHARLES JOHN ROBINSON.
JOHN BACKHOUSE.

Witnesses:
THOMAS LORD,
THOMAS WHITWORTH.